UNITED STATES PATENT OFFICE.

ZOTIQUE BESSETTE, OF MONTREAL, QUEBEC, CANADA.

PAINT MIXTURE.

1,116,977.

No Drawing.

Specification of Letters Patent. Patented Nov. 10, 1914.

Application filed July 20, 1912. Serial No. 710,547.

*To all whom it may concern:*

Be it known that I, ZOTIQUE BESSETTE, a subject of the King of Great Britain, residing at Montreal, Province of Quebec, Canada, have invented certain new and useful Improvements in Paint Mixtures; and I do hereby declare that the following is a full, clear, and exact description of the invention, such as will enable others skilled in the art to which it appertains to make and use the same.

The invention to be hereinafter described relates to paint mixtures.

In order to more clearly disclose the invention and the method and mode of its use and operation, a single general example will be given.

Mix together at normal temperatures, in approximately the following proportions: 2% of benzin, 97% of lime water, and 1% of saffron coloring matter, or the like. The saffron gives to the lime water and benzin mixture a color closely resembling that of linseed oil. Excepting for this coloring purpose, it may be omitted, without injury. The benzin is not an absolutely essential ingredient. Next, mix the resulting mixture with an equal volume of any ordinary and well known oil mixed paint. The result is a good paint of the same appearance as before and having all of the qualities of the same. In appearance, the final mixture seems a little thicker than the paint alone. None of the desired qualities of the paint are in any way lessened or weakened by the admixture. In fact, they seem to be strengthened. There is no change in the color of the paint. The reasons for these facts would seem to be that the mixture added to the paint probably absorbs a large quantity of pigment which usually remains unabsorbed in all ordinary oil mixed paints.

Having thus fully described my invention, what I claim as new and desire to secure by Letters Patent is:

1. A composition of matter comprising oil and pigment forming a paint and lime water added after the mixture of oil and pigment, the volume of lime water being nearly equal to the volume of oil and pigment.

2. A composition of matter consisting of oil, pigment forming a paint therewith and an equal quantity of a mixture comprising benzin 2%, lime water 97% and coloring matter 1%, said mixture being added after the paint is formed.

In witness whereof I have hereunto set my hand in the presence of two witnesses.

ZOTIQUE BESSETTE.

Witnesses:
W. S. BABCOCK,
G. J. GUESWIN.

Copies of this patent may be obtained for five cents each, by addressing the "Commissioner of Patents, Washington, D. C."